(12) United States Patent
Han et al.

(10) Patent No.: US 12,705,302 B2
(45) Date of Patent: Aug. 11, 2026

(54) METHOD, ACCELERATOR, AND ELECTRONIC DEVICE WITH TENSOR PROCESSING

(71) Applicant: SAMSUNG ELECTRONICS CO., LTD., Suwon-si (KR)

(72) Inventors: Songyi Han, Hwaseong-si (KR); Sangwon Ha, Seongnam-si (KR); Donghyuk Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 809 days.

(21) Appl. No.: 17/091,338

(22) Filed: Nov. 6, 2020

(65) Prior Publication Data

US 2021/0406646 A1 Dec. 30, 2021

(30) Foreign Application Priority Data

Jun. 30, 2020 (KR) ........................ 10-2020-0080219

(51) Int. Cl.
*G06N 3/06* (2006.01)
*G06F 9/38* (2018.01)
(Continued)

(52) U.S. Cl.
CPC ............ *G06F 17/16* (2013.01); *G06F 9/3836* (2013.01); *G06F 9/3877* (2013.01);
(Continued)

(58) Field of Classification Search
CPC ...... G06F 17/16; G06F 9/3836; G06F 9/3877; G06F 18/214; G06F 15/7807; G06N 3/06;
(Continued)

(56) References Cited

U.S. PATENT DOCUMENTS 10,037,490 B2 7/2018 Young et al.
10,366,050 B2 7/2019 Henry et al.
(Continued)

FOREIGN PATENT DOCUMENTS

KR 10-2018-0034853 A 4/2018
KR 10-2019-0084705 A 7/2019

OTHER PUBLICATIONS

Korean Office Action issued on Nov. 27, 2024 in corresponding Korean Patent Application No. 10-2020-0080219 (3 pages in English and 6 pages in Korean).

*Primary Examiner* — Henry Nguyen
(74) *Attorney, Agent, or Firm* — NSIP Law

(57) ABSTRACT

A processor-implemented tensor processing method includes: receiving a request to process a neural network including a normalization layer by an accelerator; and generating an instruction executable by the accelerator in response to the request, wherein, by executing the instruction, the accelerator is configured to determine an intermediate tensor corresponding to a result of a portion of operations of the normalization layer, by performing, in a channel axis direction, a convolution based on an input tensor and a kernel, wherein the input tensor is of the normalization layer and includes a plurality of channels, a number of input channels of the kernel is determined based on the input tensor, and scaling values of elements of the kernel are determined based on the number of input channels.

22 Claims, 11 Drawing Sheets

(51) Int. Cl.

| | |
|---|---|
| ***G06F 17/16*** | (2006.01) |
| ***G06F 18/214*** | (2023.01) |
| ***G06N 3/08*** | (2023.01) |

(52) U.S. Cl.
CPC ............. *G06F 18/214* (2023.01); *G06N 3/06* (2013.01); *G06N 3/08* (2013.01)

(58) Field of Classification Search
CPC .......... G06N 3/08; G06N 3/045; G06N 3/063; G06N 5/041; G06N 20/10
See application file for complete search history.

(56) References Cited

U.S. PATENT DOCUMENTS

| | | | | |
|---|---|---|---|---|
| 10,366,328 | B2 | 7/2019 | Yang et al. | |
| 10,452,540 | B2 | 10/2019 | Akopyan et al. | |
| 10,474,627 | B2 | 11/2019 | Henry et al. | |
| 10,909,728 | B1 * | 2/2021 | Appalaraju | G06T 3/40 |
| 11,175,919 | B1 * | 11/2021 | Minkin | G06F 9/52 |
| 2017/0103310 | A1 | 4/2017 | Henry et al. | |
| 2018/0165577 | A1 * | 6/2018 | Young | G06N 3/0464 |
| 2018/0285715 | A1 * | 10/2018 | Son | G06N 3/04 |
| 2019/0138892 | A1 * | 5/2019 | Kim | G06N 3/049 |
| 2019/0294962 | A1 * | 9/2019 | Vezer | G06N 7/01 |
| 2020/0000362 | A1 * | 1/2020 | Wallace | G06T 7/0012 |
| 2020/0097818 | A1 | 3/2020 | Li et al. | |
| 2020/0110995 | A1 * | 4/2020 | Croxford | G06N 3/045 |
| 2020/0160226 | A1 * | 5/2020 | Ross | G06F 7/5443 |
| 2020/0301994 | A1 * | 9/2020 | Dikici | G06N 3/063 |
| 2020/0394519 | A1 * | 12/2020 | Petrizio | G06F 17/18 |
| 2021/0034335 | A1 * | 2/2021 | Svyatkovskiy | G06N 3/088 |
| 2021/0263849 | A1 * | 8/2021 | Zheng | G06F 9/30134 |
| 2021/0370188 | A1 * | 12/2021 | Thomas | A63F 13/79 |
| 2022/0300253 | A1 * | 9/2022 | Nagamatsu | G06F 17/153 |

* cited by examiner

METHOD, ACCELERATOR, AND ELECTRONIC DEVICE WITH TENSOR PROCESSING

CROSS-REFERENCE TO RELATED APPLICATIONS

This application claims the benefit under 35 USC § 119(a) of Korean Patent Application No. 10-2020-0080219 filed on Jun. 30, 2020 in the Korean Intellectual Property Office, the entire disclosure of which is incorporated herein by reference for all purposes.

BACKGROUND

1. Field

The following description relates to a method, an accelerator, and an electronic device with tensor processing.

2. Description of Related Art

Independent hardware may be dedicated to artificial intelligence (AI). For example, AI may perform inference and learning through predetermined operations. As such, various devices may be exclusive hardware for implementing and executing AI.

The exclusive hardware for AI may be implemented by, for example, a graphics processing unit (GPU), or implemented by a field-programmable gate array (FPGA), and an application-specific integrated circuit (ASIC) of changeable use.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented tensor processing includes: receiving a request to process a neural network including a normalization layer by an accelerator; and generating an instruction executable by the accelerator in response to the request, wherein, by executing the instruction, the accelerator is configured to determine an intermediate tensor corresponding to a result of a portion of operations of the normalization layer, by performing, in a channel axis direction, a convolution based on an input tensor and a kernel, wherein the input tensor is of the normalization layer and includes a plurality of channels, a number of input channels of the kernel is determined based on the input tensor, and scaling values of elements of the kernel are determined based on the number of input channels.

The intermediate tensor may be determined by subtracting an average value of one or more elements of the input tensor from a value of each of the one or more elements through the convolution, and an output tensor corresponding to an output of the normalization layer may be determined based on the intermediate tensor.

The number of input channels and a number of output channels of the kernel may be equal to a number of channels of the input tensor, and diagonal elements of the kernel may have different scaling values from scaling values of remaining elements of the kernel.

The number of input channels and a number of output channels of the kernel may be equal to a number of elements included in a same channel of the input tensor, and diagonal elements of the kernel may have different scaling values from scaling values of remaining elements of the kernel.

The convolution may be performed between the kernel and a transformed input tensor transformed such that elements included in a same channel of the input tensor are arranged in the channel axis direction, and the intermediate tensor may be determined by transforming elements determined as a result of the convolution to a same form as the input tensor.

The transforming of the determined elements may include transforming the determined elements such that a number of channels of the intermediate tensor is equal to a number of channels of the input tensor.

The number of input channels of the kernel may be equal to a number of channels of the input tensor, and the scaling values of the elements of the kernel may correspond to an inverse of the number of channels of the input tensor.

The intermediate tensor may be determined based on an average value of elements included in the input tensor.

Elements of the intermediate tensor may be respectively determined by averaging elements included in either one of: a same column in each channel of the input tensor; and a same channel of the input tensor.

The number of input channels of the kernel may be equal to a number of elements included in a same channel of the input tensor, and scaling values of the elements of the kernel may correspond to an inverse of the number of elements included in the same channel.

The convolution may be performed in the accelerator such that the input tensor is not transmitted externally from the accelerator for performing an operation according to the normalization layer.

The accelerator may be included in either one or both of a user terminal configured to receive data to be inferred using the neural network, and a server configured to receive the data to be inferred from the user terminal.

The receiving of the request may include receiving the request by a host processor, and the generating of the instruction may include generating the instruction by the host processor.

A non-transitory computer-readable storage medium may store instructions that, when executed by one or more processors, configure the one or more processors to perform the method.

In another general aspect, an accelerator includes: one or more processors configured to:

obtain an input tensor of a normalization layer included in a neural network, obtain a kernel having a number of input channels determined based on the input tensor and including elements of scaling values determined based on the number of input channels, and determine an intermediate tensor corresponding to a result of a portion of operations of the normalization layer, by performing, in a channel axis direction, a convolution which is based on the input tensor and the kernel.

The one or more processors may be configured to determine the intermediate tensor by subtracting an average value of one or more elements of the input tensor from a value of each of the one or more elements through the convolution, and an output tensor corresponding to an output of the normalization layer may be determined based on the intermediate tensor.

The number of input channels and a number of output channels of the kernel may be equal to a number of channels of the input tensor, and diagonal elements of the kernel may have different scaling values from scaling values of remaining elements of the kernel.

The number of input channels and a number of output channels of the kernel may be equal to a number of elements included in a same channel of the input tensor, and diagonal elements of the kernel may have different scaling values from scaling values of remaining elements of the kernel.

The one or more processors may be configured to: perform the convolution between the kernel and a transformed input tensor transformed such that elements included in a same channel of the input tensor are arranged in the channel axis direction; and determine the intermediate tensor by transforming elements determined as a result of the convolution to a same form as the input tensor.

The number of input channels of the kernel may be equal to a number of channels of the input tensor, and the scaling values of the elements of the kernel may correspond to an inverse of the number of channels of the input tensor.

The number of input channels of the kernel may be equal to a number of elements included in a same channel of the input tensor, and scaling values of the elements of the kernel may correspond to an inverse of the number of elements included in the same channel.

The convolution may be performed inside the accelerator such that the input tensor is not transmitted externally from the accelerator for performing an operation according to the normalization layer.

An electronic device may include: a host processor configured to generate an instruction; and the accelerator, wherein the accelerator is configured to, by executing the instruction, determine the intermediate tensor.

In another general aspect, an electronic device includes: a host processor configured to generate an instruction executable by an accelerator in response to a request to process a neural network including a normalization layer by the accelerator; and the accelerator configured to, by executing the instruction, determine an intermediate tensor corresponding to a result of a portion of operations of the normalization layer, by performing, in a channel axis direction, a convolution which is based on an input tensor and a kernel, wherein the input tensor is of the normalization layer and includes a plurality of channels, a number of input channels of the kernel is determined based on the input tensor, and scaling values of elements of the kernel are determined based on the number of input channels.

The accelerator may be configured to determine the intermediate tensor by subtracting an average value of one or more elements of the input tensor from a value of each of the one or more elements through the convolution, and an output tensor corresponding to an output of the normalization layer may be determined based on the intermediate tensor.

In another general aspect, an accelerator includes: an on-chip memory; and one or more processors configured to: determine a kernel based on information, received from the on-chip memory, indicating a number of channels to be convoluted and indicating whether an operation of a normalization layer of a neural network is an average operation or an average subtraction operation, determine, based on an input tensor of the normalization layer received from the on-chip memory, an intermediate tensor corresponding to a result of the operation of the normalization layer, by performing a convolution which based on the received input tensor and the determined kernel.

In another general aspect, an electronic device includes: a host processor configured to generate an instruction in response to a request for a data inference result; and an accelerator configured to, by executing the instruction: determine, using a hidden layer of a neural network, an input tensor of a normalization layer included in the neural network; determine an intermediate tensor, corresponding to a result of operations of the normalization layer, by performing a convolution based on an input tensor and a kernel, a number of input channels of the kernel is determined based on the input tensor, and scaling values of elements of the kernel are determined based on the number of input channels; and determine the data inference result based the performing of the operations.

The data inference result may be any one of a speech recognition, a machine translation, a machine interpretation, an object recognition, a pattern recognition, and computer vision.

The device may be a user terminal including any one of a smart phone, a tablet, a laptop, a personal computer, a smart watch, smart glasses, a smart speaker, a smart TV, a smart refrigerator, a smart car, a smart kiosk, and an Internet of things (IoT) device.

Other features and aspects will be apparent from the following detailed description, the drawings, and the claims.

Figure 1:
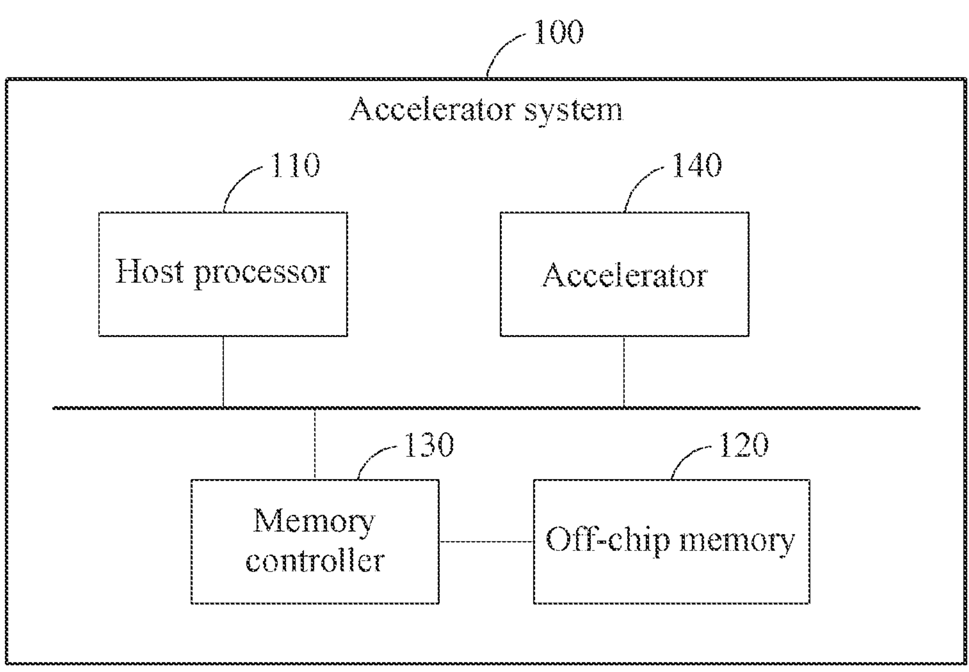
FIG. 1 illustrates an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the present disclosure, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. The following specific structural or functional descriptions are exemplary to merely describe the examples, and the scope of the examples is not limited to the descriptions provided in the present disclosure. Various changes and modifications can be made thereto by those of ordinary skill in the art based on an understanding of the disclosure of the present application. Like reference numerals in the drawings denote like elements, and a known function or configuration will be omitted herein.

FIG. 1 illustrates an example of an electronic device.

Referring to FIG. 1, an electronic device 100 may include a host processor 110 (e.g., one or more processors), an off-chip memory 120, a memory controller 130, and an accelerator 140. The host processor 110, the off-chip memory 120, the memory controller 130, and the accelerator 140 may communicate with each other through a bus.

The host processor 110 may be a device that controls operations of components included in the electronic device 100, and may include, for example, a central processing unit (CPU). The host processor 110 may receive a request to process a neural network in the accelerator 140, and generate an instruction executable by the accelerator 140 in response to the request. The request may be for data inference based on the neural network, and, in response to the generated instruction, the accelerator 140 may execute the neural network to obtain (e.g., determine) a data inference result for speech recognition, machine translation, machine interpretation, object recognition, pattern recognition, computer vision, and/or the like. The host processor 110 may transmit inference target data and parameters of the neural network to the accelerator 140.

The off-chip memory 120 may be a memory disposed outside the accelerator 140, and may be, for example, a dynamic random-access memory (DRAM) utilized as a main memory of the electronic device 100. The off-chip memory 120 may be accessed through the memory controller 130. The off-chip memory 120 may store the parameters of the neural network to be executed by the accelerator 140, and be utilized when an on-chip memory in the accelerator 140 is insufficient (e.g., in memory capacity) to execute the neural network by the accelerator 140.

The off-chip memory 120 may have a larger memory capacity than the on-chip memory in the accelerator 140. However, when the neural network is being executed, a memory access cost for the accelerator 140 accessing the off-chip memory 120 may be greater than a memory access cost for the accelerator 140 accessing the internal on-chip memory. The memory access cost may be a power and/or time required to access the corresponding memory and read or write data.

The accelerator 140 may be an AI accelerator that infers input data by executing the neural network according to the instruction of the host processor 110, and may be a separate processor different from the host processor 110. For example, the accelerator 140 may be a neural processing unit (NPU) (or neural processor), a GPU, or a tensor processing unit (TPU).

The accelerator 140 may be a separate exclusive processor that processes tasks more efficiently than the general-purpose host processor 110, due to the characteristics of the operations of the neural network. In this example, the on-chip memory and one or more processing elements (PEs) included in the accelerator 140 may be utilized by the accelerator 140 in executing the neural network. The on-chip memory may be a global buffer included in the accelerator 140 and may be distinguished from the off-chip memory 120 disposed outside the accelerator 140. For example, the on-chip memory may be a scratchpad memory, a static random-access memory (SRAM), or the like that is accessible through an address space.

The neural network may include a plurality of layers. The neural network may include an input layer, a plurality of hidden layers, and an output layer. Each of the layers may include a plurality of nodes, also called artificial neurons. While the nodes may be referred to as "artificial neurons," such reference is not intended to impart any relatedness with respect to how the neural network architecture computationally maps or thereby intuitively recognizes information and how a human's neurons operate. I.e., the term "artificial neurons" is merely a term of art referring to the hardware implemented nodes of the neural network. Each node may be a calculation unit having one or more inputs and an output, and the nodes may be connected to each other. A weight may be set for a connection between nodes, and the weight may be adjusted or changed. The weight may amplify, reduce, or maintain a relevant data value, thereby determining a degree of influence of the data value on a final result. Weighted inputs of nodes included in a previous layer may be input into each node included in the output layer. A process of inputting weighted data from a predetermined layer to the next layer may be referred to as propagation.

To improve the performance of the neural network, normalization may be applied to data transferred between layers of the neural network. In other words, data distribution may be normalized through a series of operations such as obtaining an average value of data (e.g., output data of one layer) and subtracting a value of each element of the corresponding data from the average value (e.g., to obtain data to be transferred to a next layer as input data). The normalization applied to the neural network may include, for example, layer normalization and instance normalization. Layer normalization may be a technique for performing normalization in a channel direction regardless of the batch size, and may be applied to models in language field, such as speech recognition, machine translation, and machine interpretation. Instance normalization may be a technique for normalizing the entire image in the unit of channels, and may be applied to, for example, a generative adversarial network (GAN).

In addition, when an attention technique is applied to a neural network for image processing, global average pooling in which a pooling window is in the size equal to the size of the entire image may be performed, and neural networks to which global average pooling is applied may include, for example, a spatial pyramid pooling network (SPPNet) and/or a squeeze and excitation network (SENet).

As described above, operations of the neural network may include, for each time data is transferred between layers, an operation for calculating the average value of output data of one layer and/or subtracting the average value from a value of each element in the data to obtain data to be transferred to a next layer. For such average operation and/or average subtraction operation, a typical electronic device may transfer the data to be normalized from an accelerator to a special operator such as a host processor outside the accelerator, and an average value calculated by the special operator may be received again by the accelerator, and such data movement may increase latency and power consumption of the typical electronic device. Accordingly, to improve the performance of the electronic device 100 over such typical electronic device, the electronic device 100 of one or more embodiments may minimize data movements outside the accelerator 140 by performing, inside the accelerator 140, the average operation and/or the average subtraction operation using the neural network.

To implement the average operation and/or the average subtraction operation. which may not be directly supported by the accelerator 140, the average operation and/or the average subtraction operation may be replaced with a convolution operation performed by the accelerator 140. A kernel used for the convolution operation may be generated based on the data to be normalized. Through this, the accelerator 140 may obtain output data identical to outputs that would be generated by directly performing operations specified by a normalization layer based on the convolution operation, even when the convolution operation does not identically match the operations specified by the normalization layer. In summary, the accelerator 140 may obtain output data equivalent to the outputs of the normalization layer, even without transmitting input data to the special operator such as the host processor 110 and without correction of the hardware architecture of the accelerator 140.

Hereinafter, a detailed description will be provided with reference to the following drawings.

Figure 2:
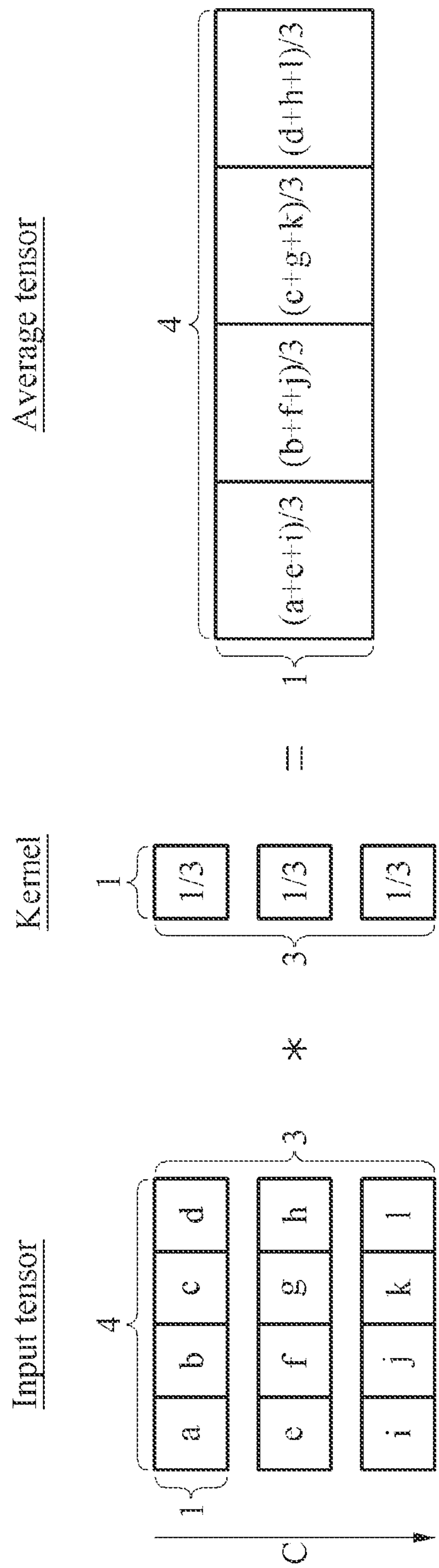
FIGS. 2 and 3 illustrate examples of processing a tensor for a first normalization layer by an accelerator.
Figure 3:
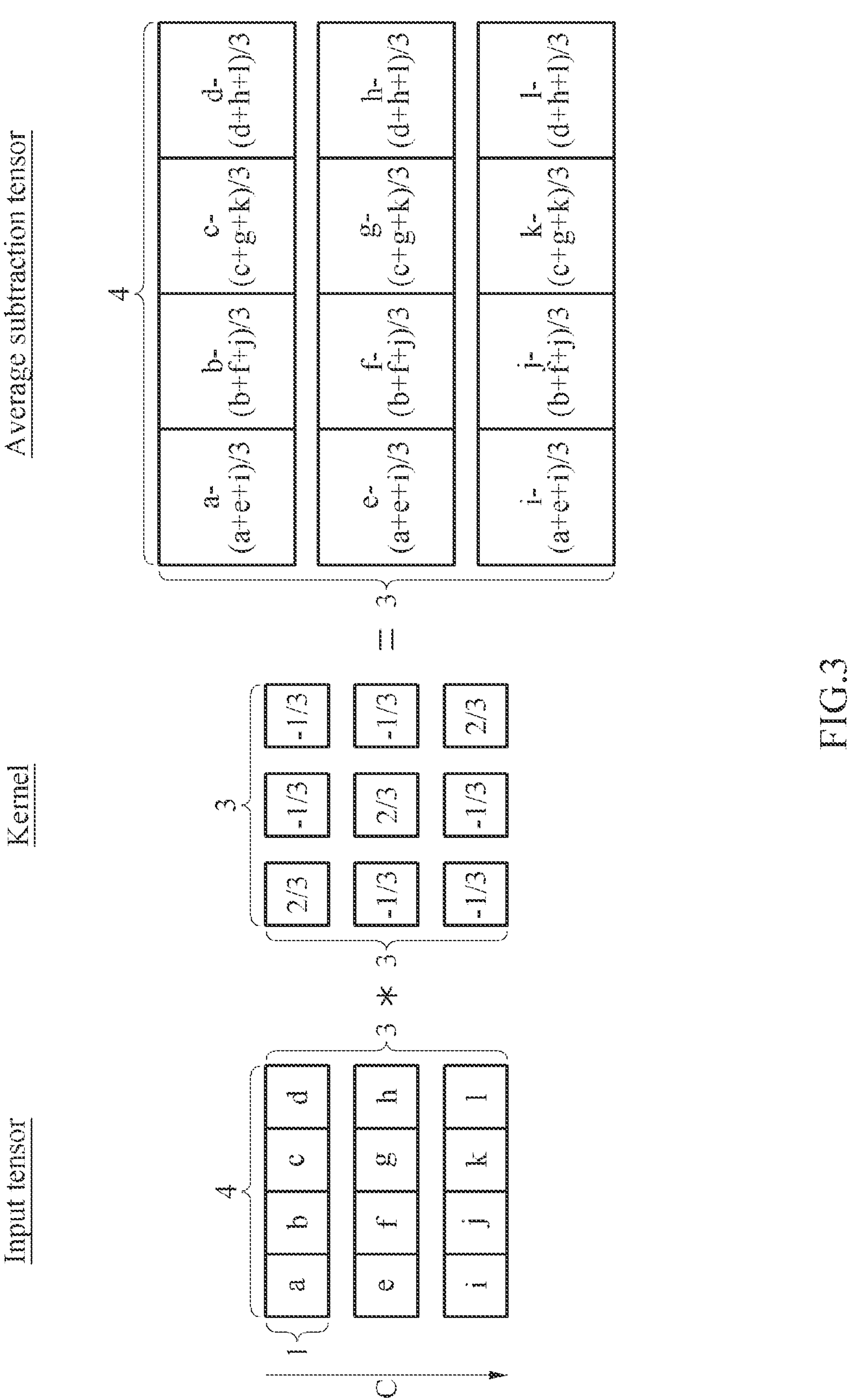

FIGS. 2 and 3 illustrate examples of processing a tensor for a first normalization layer by an accelerator (e.g., the accelerator 140).

Referring to FIG. 2, an example of a convolution operation for obtaining an average operation result according to a first normalization layer is illustrated. The first normalization layer may be based on layer normalization, wherein convolution may be performed to decrease a size of a tensor in a channel axis direction. Examples of the tensor shapes, the kernel shape, and the element values shown in FIG. 2 are provided for ease of description, and various shapes and element values are applicable without limitation.

An input tensor of FIG. 2 may be data input into a first normalization layer. In the example of FIG. 2, the input tensor has a (1, 3, 1, 4) shape, and the value of each element may be represented by any one of a to l. In the example of FIG. 2, the tensor structure of FIG. 2 is expressed as (batch, channel, height, width). In an example, the input tensor may correspond to output data of one layer (e.g., a hidden layer) of a neural network.

A kernel shown in FIG. 2 may have a number (e.g., a total number) of input channels determined based on the input tensor. For example, the number of input channels of the kernel may be equal to a number of channels of the input tensor. A number of output channels of the kernel that is applied to a convolution operation for obtaining an average operation result may be "1". In the example of FIG. 2, the kernel has a (1, 1, 3, 1) shape, where the kernel shape is expressed as (height, width, input channel, output channel). Further, scaling values of the elements included in the kernel may correspond to an inverse of the number of channels of the input tensor. In the example of FIG. 2, the scaling values are ⅓. In the present disclosure, a scaling value may also be referred to as a weight value for ease of description.

Convolution between the input tensor and the kernel may be performed in the channel axis direction. In FIG. 2, the channel axis direction may be indicated by C. For example, values a, e, and i of first elements in each channel of the input tensor may be multiplied by the corresponding scaling values ⅓ of the kernel and results of the multiplying may be summed, such that a value of a first element in the average tensor shown in FIG. 3 may be determined to be (a+e+i)/3. Likewise, convolution may be similarly performed on the remaining elements as well, such that values of second, third, and fourth elements in the average tensor may be respectively determined to be (b+f+j)/3, (c+g+k)/3, and (d+h+l)/3. Accordingly, each element in the average tensor may include an average value of the corresponding elements in the input tensor. The average tensor may have a (1, 1, 1, 4) shape, which is reduced in size from the (1, 3, 1, 4) shape of the input tensor in the channel axis direction, while maintaining a batch, height, and width size. In other words, a number of channels may be reduced through the convolution operation without reducing a number of batches, a height, and a width. By determining the average tensor as described above with reference to FIG. 2, the average value of the input tensor may be determined in the accelerator 140 through a single convolution operation, without transmitting the input tensor to a special operator such as the host processor 110.

Referring to FIG. 3, an example of a convolution operation for obtaining an average subtraction operation result according to a first normalization layer is illustrated. The first normalization layer may be based on layer normalization, wherein a convolution operation may be performed to decrease a size of a tensor in a channel axis direction, which will be further described in detail below. The tensor shapes, the kernel shape, and the element values shown in FIG. 3 are examples for ease of description, and various shapes and element values are applicable without limitation.

An input tensor shown in FIG. 3 may be data input into the first normalization layer. In the example of FIG. 3, the input tensor has a (1, 3, 1, 4) shape, where the tensor structure of FIG. 3 is expressed as (batch, channel, height, width), and the value of each element may be represented by any one of a to l. In an example, the input tensor of FIG. 3 may correspond to output data of one layer (e.g., a hidden layer) of a neural network.

A kernel shown in FIG. 3 may have a number of input channels and a number of output channels determined based on the input tensor. For example, the number of input channels and the number of output channels of the kernel may be equal to a number of channels of the input tensor. In the example of FIG. 3, the kernel may have a (1, 1, 3, 3) shape, where the kernel shape is expressed as (height, width, input channel, output channel). Further, the diagonal elements and the remaining elements in the kernel may have different scaling values. For example, the diagonal elements may have scaling values of $1-1/n$ (here, n denotes the number of channels of the input tensor), and the remaining elements may have scaling values of $-1/n$. When the number of channels n of the input tensor is "3" in the example of FIG. 3, the scaling values of the diagonal elements may be ⅔, and the scaling values of the remaining elements may be −⅓.

Convolution between the input tensor and the kernel may be performed in the channel axis direction to determine the average subtraction tensor. First, scaling values ⅔, −⅓, and −⅓ in a first column included in the kernel may be convolved to the input tensor, whereby values of elements in a first channel of the average subtraction tensor may be determined. For example, values a, e, and i of first elements in each channel of the input tensor may be multiplied respectively by the corresponding scaling values ⅔, −⅓, and −⅓ of the kernel and results of the multiplying may be summed, such that a value of a first element of the first channel of the average subtraction tensor may be determined to be ⅔a−⅓e−⅓i, that is, $a-(a+e+i)/3$. Here, $(a+e+i)/3$ corresponds to an average value of the values a, e, and i of the first elements in each channel of the input tensor. Similarly, values b, f, and j of second elements in each channel of the input tensor may be multiplied respectively by the corresponding scaling values ⅔, −⅓, and −⅓ of the kernel and results of the multiplying may be summed, such that a value of a second element of the first channel of the average subtraction tensor may be determined to be $b-(b+f+j)/3$.

Further, scaling values −⅓, ⅔, and −⅓ in a second column included in the kernel may be convolved to the input tensor, whereby values of elements in a second channel of the average subtraction tensor may be determined. For example, values a, e, and i of first elements in each channel of the input tensor may be multiplied respectively by the corresponding scaling values −⅓, ⅔, and −⅓ of the kernel and results of the multiplying may be summed, such that a value of a first element of a second channel in the average subtraction tensor may be determined to be $e-(a+e+i)/3$. Likewise, the remaining element values may be determined. Further, scaling values −⅓, −⅓, and ⅔ in a third column included in the kernel may be convolved to the input tensor, whereby values of elements in a third channel of the average subtraction tensor may be determined.

Each element in the average subtraction tensor may thus include a value obtained by subtracting an average value of values of elements in a channel of the input tensor from a value of a corresponding one of the elements in the channel of the input tensor. The average subtraction tensor may have a (1, 3, 1, 4) shape, which is the same as the shape of the input tensor. By determining the average subtraction tensor as described above with reference to FIG. 3, the average subtraction operation of the input tensor may be performed in the accelerator 140 through a single convolution operation, without transmitting the input tensor to a special operator such as the host processor 110.

Since remaining operations according to the normalization layer may be additionally applied to the average tensor and the average subtraction tensor obtained through convolution as respectively described above with reference to FIGS. 2 and 3, the average tensor and the average subtraction tensor of FIGS. 2 and 3 may also be referred to as intermediate tensors.

Figure 4:
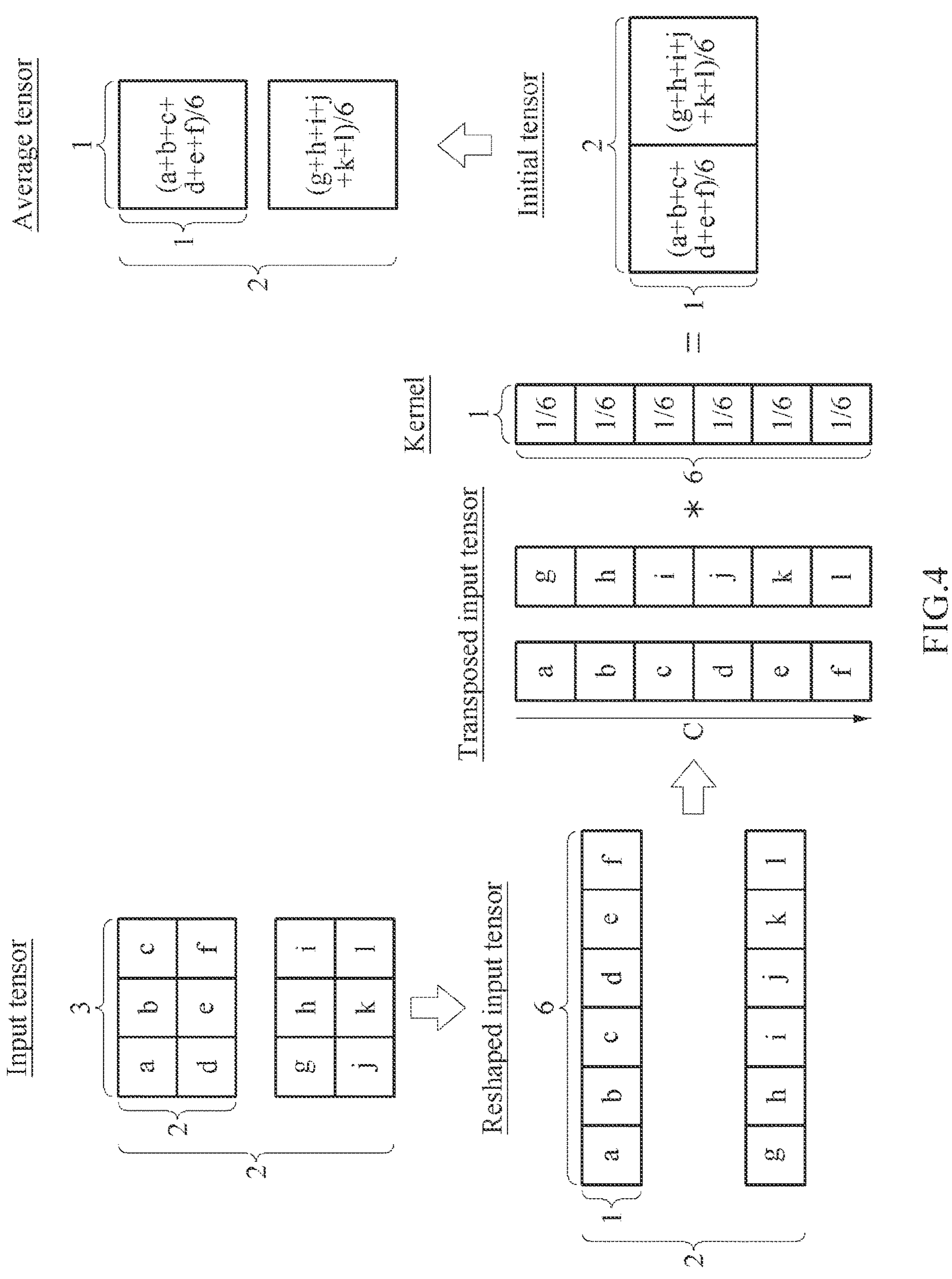
FIGS. 4 and 5 illustrate examples of processing a tensor for a second normalization layer by an accelerator.
Figure 5:
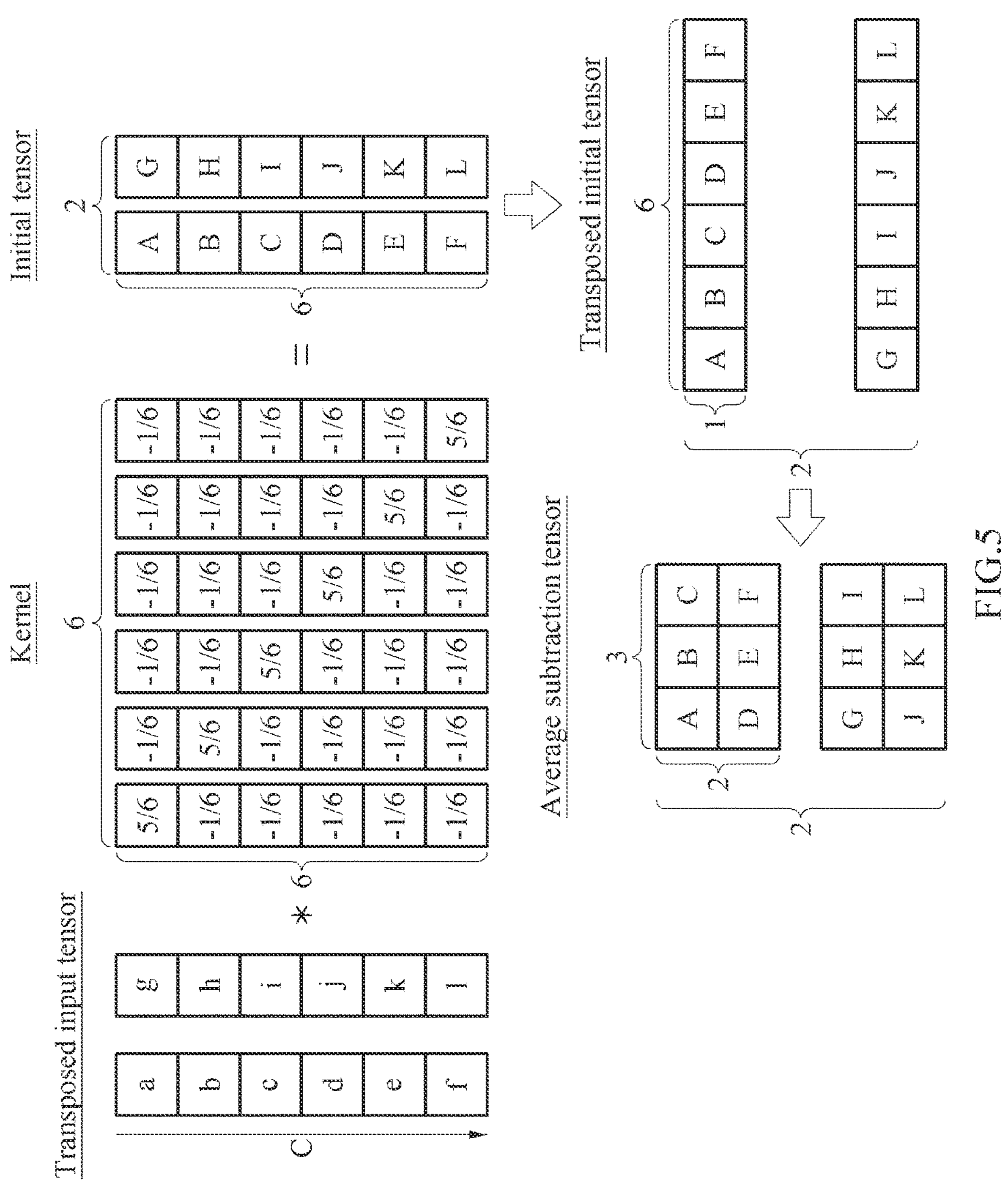

FIGS. 4 and 5 illustrate examples of processing a tensor for a second normalization layer by an accelerator (e.g., the accelerator 140).

Referring to FIG. 4, an example of a convolution operation for obtaining an average operation result according to a second normalization layer is illustrated. The second normalization layer may be based on instance normalization that normalizes the entire input tensor (e.g., an input image or convolved feature map determined based on the input image) in the unit of channels, wherein instance normalization may be achieved by changing the shape of the input tensor and then performing a convolution operation that decreases a size of the input tensor in a channel axis direction, which will be further described below. The tensor shapes, the kernel shape, and the element values shown in FIG. 4 are examples for ease of description, and various shapes and element values are applicable without limitation.

An input tensor of FIG. 4 may be data input into the second normalization layer. In the example of FIG. 4, the input tensor has a (1, 2, 2, 3) shape, where the tensor structure of FIG. 4 is expressed as (batch, channel, height, width), and the value of each element may be represented by any one of a to l.

To perform instance normalization based on a convolution operation, the input tensor may be transformed to a predetermined shape. First, two-dimensional elements in each channel of the input tensor may be reshaped into one-dimensional elements to generate a reshaped input tensor of FIG. 4. For example, elements a to f in a first channel of the input tensor may be arranged in a line, and elements g to l in a second channel may also be arranged in a line. The reshaped input tensor may have a (1, 2, 1, 6) shape. The reshaped input tensor may be transposed to generate a transposed input tensor of FIG. 4. The transposed input tensor may have a (1, 6, 1, 2) shape and may be convoluted with a kernel as described below.

A kernel shown in FIG. 4 may have a number of input channels determined based on the input tensor. For example, the number of input channels of the kernel may be equal to a number of channels of the transposed input tensor. A number of output channels of the kernel that is applied to a convolution operation for obtaining an average subtraction operation result may be "1". In the example of FIG. 4, the kernel may have a (1, 1, 6, 1) shape, where the kernel shape is expressed as (height, width, input channel, output channel). Further, scaling values of the elements included in the kernel may correspond to an inverse of the number of channels of the transposed input tensor. In the example of FIG. 4, the scaling values are ⅙.

Convolution between the input tensor and the kernel may be performed in the channel axis direction. In FIG. 4, the channel axis direction may be indicated by C. For example, values a to f of first elements in each channel of the input tensor may be multiplied by the corresponding scaling values ⅙ of the kernel and results of the multiplying may be summed, such that a value of a first element in an initial tensor of FIG. 4 may be determined to be (a+b+c+d+e+f)/6. Likewise, convolution may be similarly performed on the remaining elements as well, such that a value of a second element in the initial tensor may be determined to be (g+h+i+j+k+l)/6. The initial tensor may have a (1, 1, 1, 2) shape, which is reduced in size from the (1, 6, 1, 2) shape of the transposed input tensor in the channel axis direction, while maintaining a batch, height, and width size. In other words, a number of channels may be reduced through the convolution operation without reducing a number of batches, a height, and a width.

By transforming the initial tensor to the same form (e.g., to the same number of channels) as the input tensor, an average tensor shown in FIG. 4 may be determined. For example, by transposing the initial tensor, the average tensor having the (1, 2, 1, 1) shape may be determined. Each element in the average tensor may include an average value of the elements included in each channel of the input tensor. By determining the average tensor as described above with reference to FIG. 4, the average value of the input tensor may be determined in the accelerator 140 through a single convolution operation, without transmitting the input tensor to a special operator such as the host processor 110.

Referring to FIG. 5, an example of a convolution operation for obtaining an average subtraction operation result according to a second normalization layer is illustrated. The second normalization layer may be based on instance normalization, wherein instance normalization may be achieved by changing the shape of an input tensor and then performing a convolution operation that decreases a size of the input tensor in a channel axis direction. The tensor shapes, the kernel shape, and the element values shown in FIG. 5 are examples for ease of description, and various shapes and element values are applicable without limitation.

A transposed input tensor shown in FIG. 5 may correspond to the transposed input tensor of FIG. 4, and thus the description provided above with of the generating of the transposed input tensor of FIG. 4, to which a convolution operation is applied to obtain a result of the average subtraction operation according to the second normalization layer, may apply to the transposed input tensor of FIG. 5.

A kernel shown in FIG. 5 may have a number of input channels and a number of output channels determined based on the transposed input tensor. For example, the number of input channels and the number of output channels may be equal to a number of channels of the transposed input tensor. In the example of FIG. 5, the kernel may have a (1, 1, 6, 6) shape. Further, the diagonal elements and the remaining elements in the kernel may have different scaling values. For example, the diagonal elements may have scaling values of 1−1/n (here, n denotes the number of channels of the transposed input tensor), and the remaining elements may have scaling values of −1/n. When the number of channels n of the transposed input tensor is "6" in the example of FIG. 5, the scaling values of the diagonal elements may be ⅚, and the scaling values of the remaining elements may be −⅙.

Convolution between the transposed input tensor and the kernel may be performed in the channel axis direction to determine the initial tensor. For example, values of first elements in each channel of the transposed input tensor may be multiplied respectively by corresponding scaling values in a first column of the kernel and results of the multiplying may be summed, such that a value of a first element A of the first channel of the initial tensor may be a−(a+b+c+d+e+f)/6. Similarly, values of second elements in each channel of the transposed input tensor may be multiplied respectively by the corresponding scaling values in the first column of the kernel and results of the multiplying may be summed, such that a value of a second element G of the first channel of the initial tensor may be g−(g+h+i+j+k+l)/6. Likewise, the remaining element values of the initial tensor may be similarly determined. The descriptions of the convolution between the input tensor and the kernel provided above with respect to FIG. 3 may apply to the convolution operation between the transposed input tensor and the kernel of FIG. 5. An initial tensor generated as a result of convolution may have a (1, 6, 1, 2) shape, which is the same as that of the transposed input tensor.

By transforming the initial tensor to the same form (e.g., to the same number of channels) as an input tensor (e.g., the input tensor of FIG. 4), an average subtraction tensor shown in FIG. 5 may be determined. For example, a transposed initial tensor of FIG. 5 having a (1, 2, 1, 6) shape may be determined by transposing the initial tensor, and the average subtraction tensor having a (1, 2, 2, 3) shape, which is the same shape as that of the input tensor, may be determined by reshaping the transposed initial tensor. As described above, the average subtraction operation of the input tensor may be performed in the accelerator 140 through a single convolution operation, without transmitting the input tensor to a special operator such as the host processor 110.

Since remaining operations according to the normalization layer may be additionally applied to the average tensor and the average subtraction tensor obtained through convolution in FIGS. 4 and 5, the average tensor and the average subtraction tensor of FIGS. 4 and 5 may also be referred to as intermediate tensors.

Figure 6:
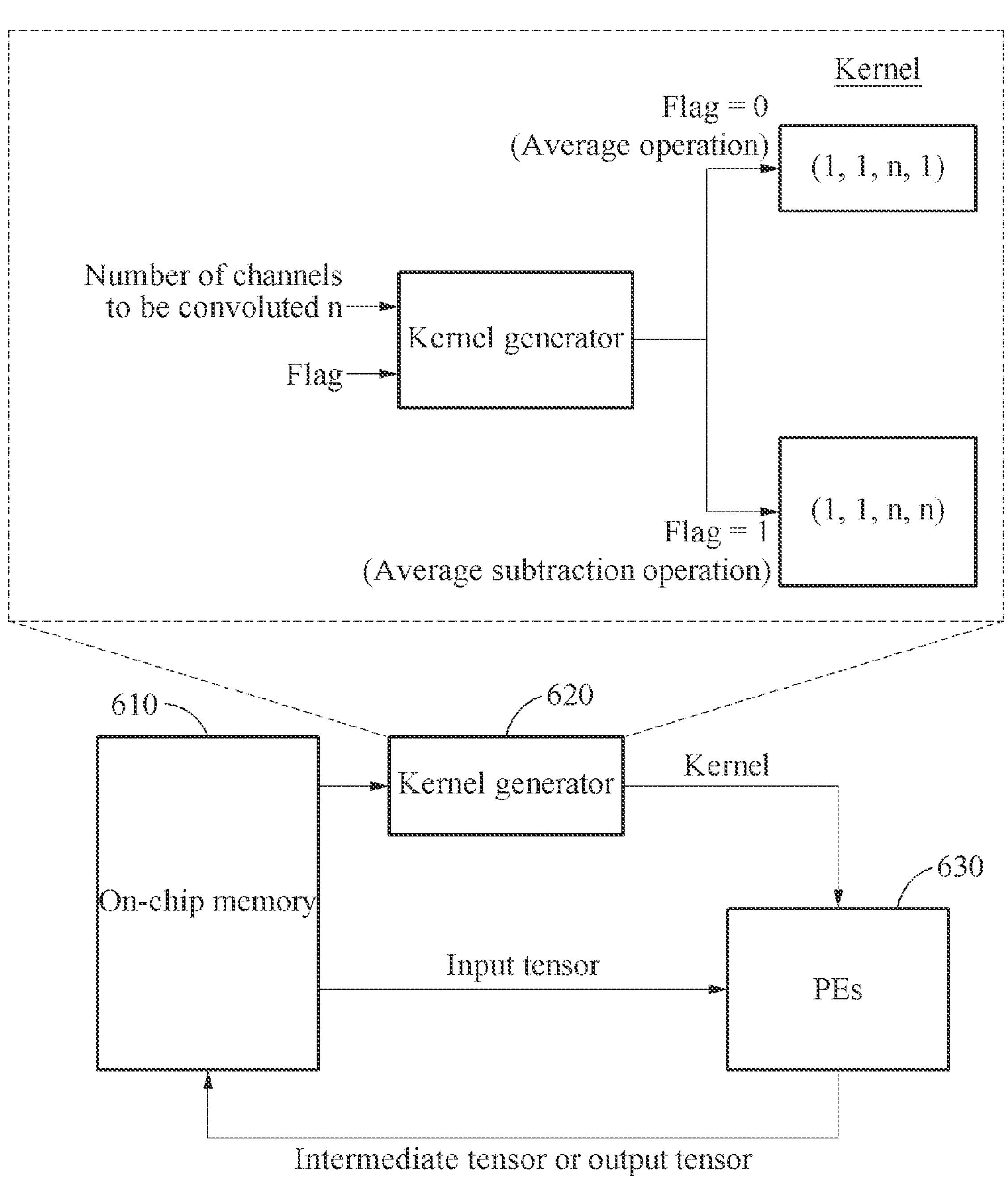
FIG. 6 illustrates an example of a kernel generator.

FIG. 6 illustrates an example of a kernel generator.

Referring to FIG. 6, an on-chip memory 610, a kernel generator 620, and PEs 630 are illustrated. In an example, any one or any combination of the on-chip memory 610, the kernel generator 620, and the PEs 630 may be included in the accelerator 140 of FIG. 1.

The kernel generator 620 may be a hardware device that generates a kernel (e.g., any one or more of the kernels described above with reference FIGS. 1-5) for convolution (e.g., any one or more of the convolutions described above with reference to FIGS. 1-5). The kernel generator 620 may receive a number of channels to be convoluted n, and a flag. The number of channels n may be determined by an input tensor (e.g., any one or more of the input tensors described above with reference to FIGS. 1-5), and may correspond to, for example, a number of channels of the input tensor in the case of layer normalization, and may correspond to, for example, a number of channels of a transposed input tensor (e.g., any one or more of the transposed input tensors described above with reference to FIGS. 1-5) in the case of instance normalization. The flag may be an indicator indicating whether a normalization operation to be replaced with convolution is an average operation or an average subtraction operation. For example, the flag having a value of "0" may indicate that an average operation is to be implemented as convolution, and the flag having a value of "1" may indicate that an average subtraction operation is to be implemented as convolution. The kernel generator 620 may generate a kernel of a (1, 1, n, 1) shape if the flag has a value of "0", and may generate a kernel of a (1, 1, n, n) shape if the flag has a value of "1".

The kernel generated by the kernel generator 620 may be transferred to the PEs 630, and the PEs 630 may perform convolution between the kernel and the input tensor received from the on-chip memory 610, thereby determining an intermediate tensor (e.g., any one or more of the average tensors and the average subtraction tensors described above with reference to FIGS. 1-5). The determined intermediate tensor may be transmitted to the on-chip memory 610 for remaining operations according to the normalization layer. Alternatively, the remaining operations according to the normalization layer may be subsequently performed in the PEs 630, and an output tensor determined as a result may be transmitted to the on-chip memory 610.

Figure 7:
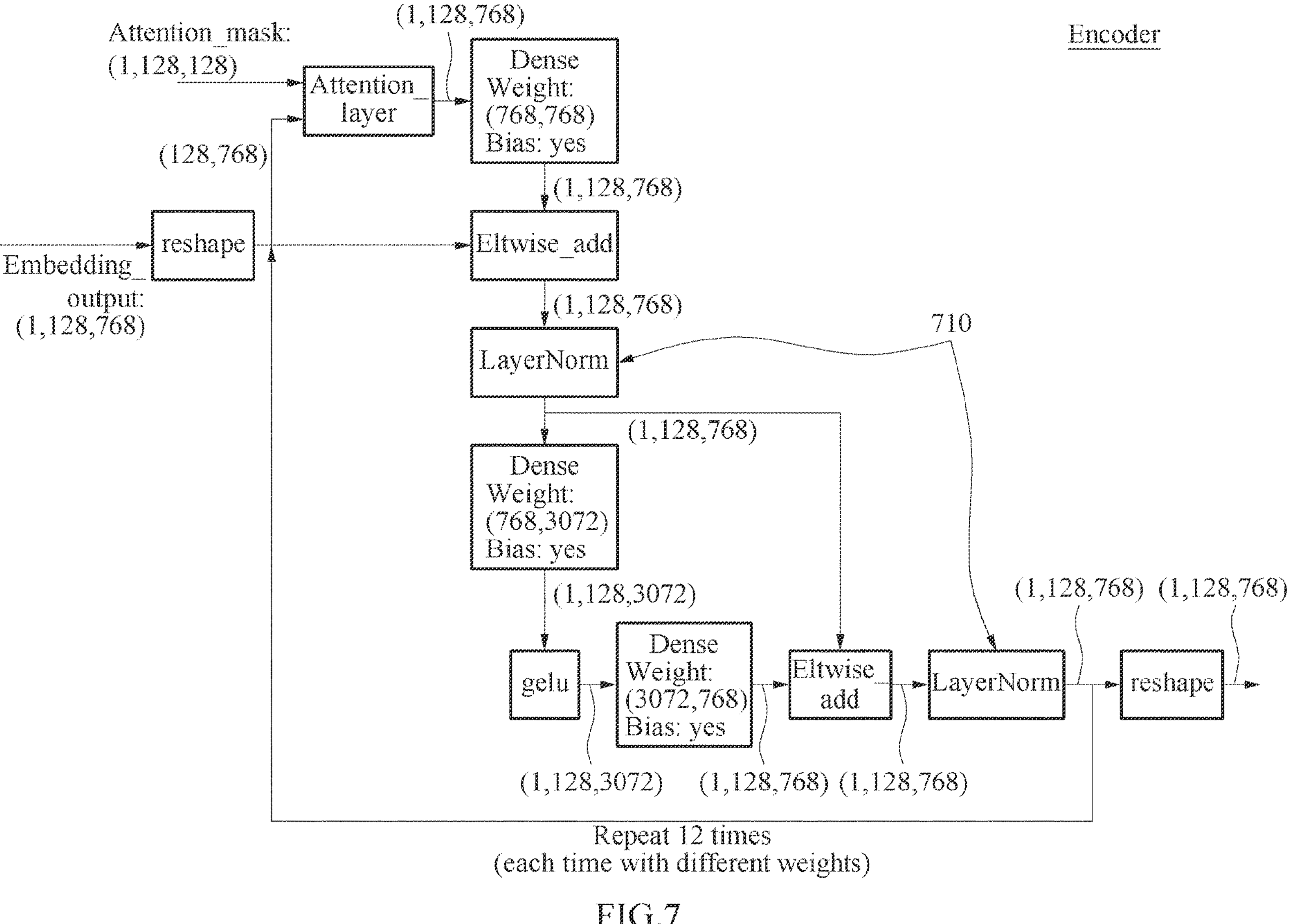
FIG. 7 illustrates an example of a neural network including a normalization layer.

FIG. 7 illustrates an example of a neural network including a normalization layer.

Referring to FIG. 7, a bidirectional encoder representations from transformers (BERT) model is illustrated. Normalization layers 710 exist among a plurality of layers included in the BERT model, wherein when the corresponding model is repeated 12 times, the normalization layers 710 are executed a total of 12 times. When the normalization layers 710 are disposed apart from each other, a typical electronic device implementing the BERT model may not be configured to process both of the normalization layers 710 outside an accelerator (e.g., in a special operator such as a host processor) at one time, and/or the cost (e.g., memory access cost) for data movement may be great when the normalization layers 710 are processed outside the accelerator each time. However, when the normalization layers 710 are replaced with the convolution described above with reference to FIGS. 1-6, operations of the normalization layers 710 may be performed in the accelerator 140 of one or more embodiments, and such cost may be effectively prevented.

Figure 8:
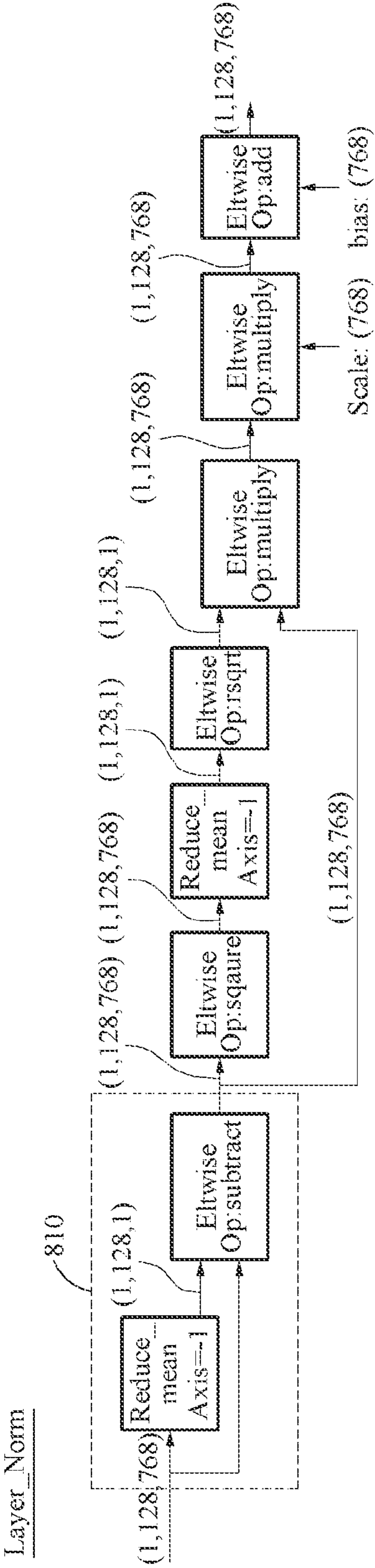
FIG. 8 illustrates an example of a normalization layer.

FIG. 8 illustrates an example of a normalization layer.

Referring to FIG. 8, an internal structure of a normalization layer is illustrated. The normalization layer shown in FIG. 8 may be a layer for performing layer normalization included in the BERT model of FIG. 7. An average subtraction operation 810 may be performed in a first part of the normalization layer. By replacing the average subtraction operation 810 with a single convolution (e.g., any one or more of the convolutions described above with reference to FIGS. 1-7), the electronic device 100 of one or more embodiments may effectively suppress the movement of the input tensor outside the accelerator 140, thereby reducing a memory access cost for the accelerator 140 accessing the off-chip memory 120.

Figure 9:
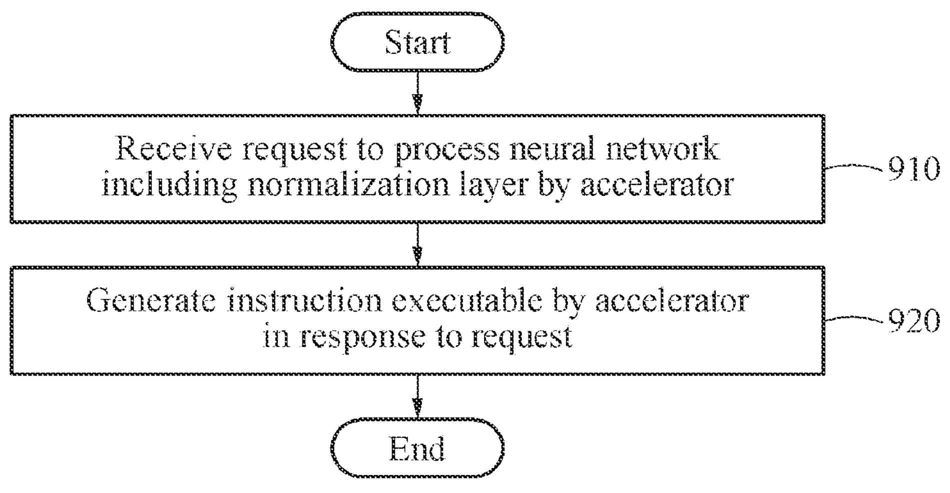
FIGS. 9 and 10 illustrate examples of tensor processing methods.
Figure 10:
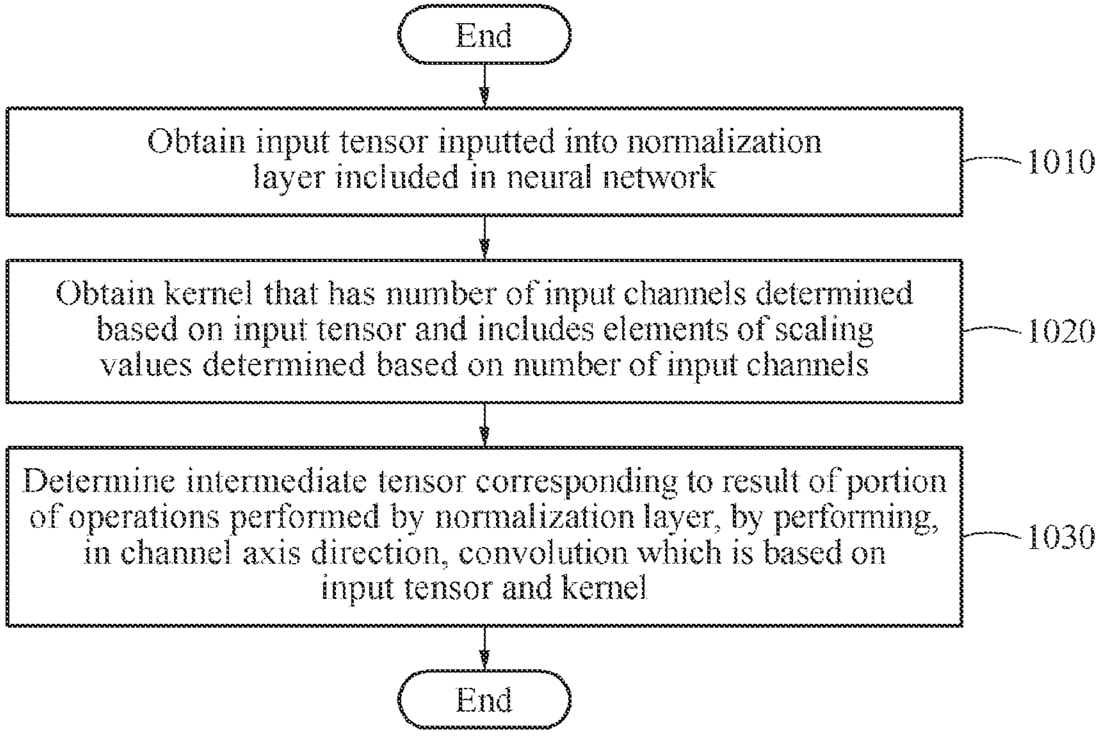

FIGS. 9 and 10 illustrate examples of tensor processing methods.

Referring to FIG. 9, a tensor processing method performed by a host processor (e.g., the host processor 110 of FIG. 1) is illustrated. In operation 910, the host processor may receive a request to process a neural network including a normalization layer by an accelerator. In operation 920, the host processor may generate an instruction executable by the accelerator in response to the request. When the instruction is executed by the accelerator, the accelerator may determine an intermediate tensor corresponding to a result of a portion of operations performed by a normalization layer, by performing, in a channel axis direction, a convolution which is based on an input tensor and a kernel.

Referring to FIG. 10, a tensor processing method performed by an accelerator (e.g., the accelerator 140 of FIG. 1) is illustrated. In operation 1010, the accelerator may obtain an input tensor of a normalization layer included in a neural network. In operation 1020, the accelerator may obtain a kernel that has a number of input channels determined based on the input tensor and that includes elements of scaling values determined based on the number of input channels. In operation 1030, the accelerator may determine an intermediate tensor corresponding to a result of a portion of operations performed by a normalization layer, by performing, in a channel axis direction, a convolution which is based on an input tensor and a kernel.

The tensor processing method may be applied for training or inference at an algorithm end, a compiler end, hardware of a network using multi-head attention such as automatic speech recognition (ASR), or a transformer. In addition, even when a low-precision quantization scheme is applied to the tensor processing method, the performance gain may be secured while the system accuracy may remain the same.

The descriptions provided with reference to FIGS. 1 to 8 may apply to the operations shown in FIGS. 9 and 10.

Figure 11:
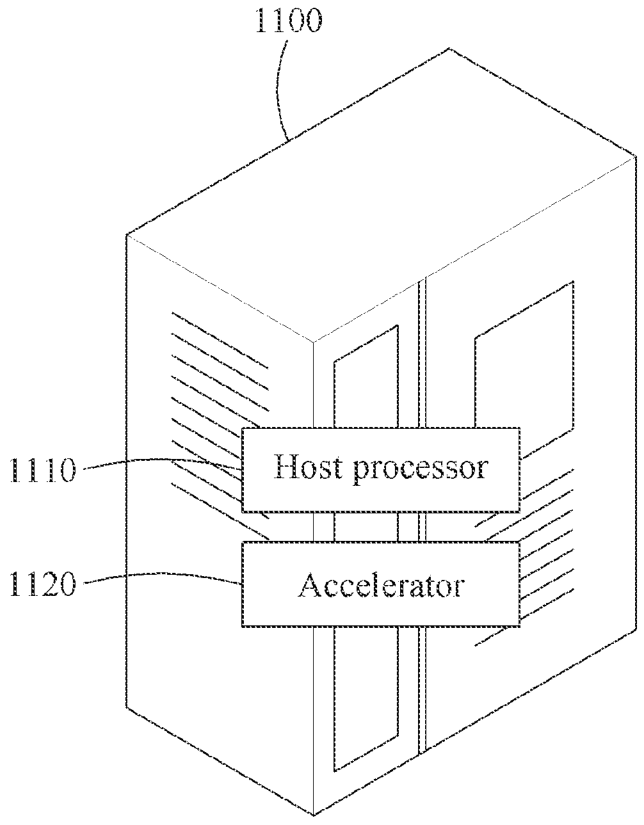
FIGS. 11 and 12 illustrate examples of electronic devices.
Figure 12:
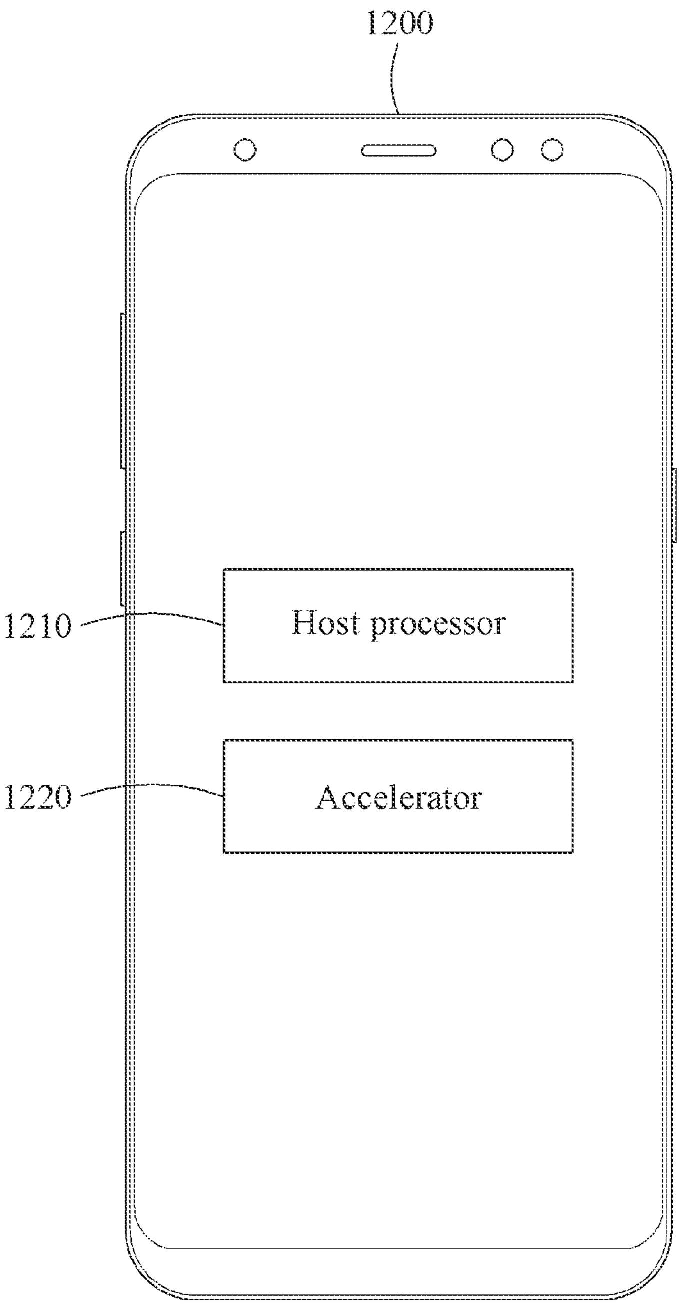

FIGS. 11 and 12 illustrate examples of electronic devices.

Referring to FIG. 11, an electronic device (e.g., the electronic device 100 of FIG. 1) may be implemented as a server 1100.

The server 1100 may be a separate device different from a user terminal controlled by a user, and may communicate with the user terminal through a wired and/or wireless network. Data to be inferred using a neural network may be collected from the user terminal and transmitted to the server 1100 through the network, and the server 1100 may process a normalization layer included in the neural network by an accelerator 1120 according to the tensor processing methods described above with reference to FIGS. 1-10. In this example, an input tensor of the normalization layer may not be transmitted to a host processor 1110 outside the accelerator 1120. Then, the server 1100 may obtain an inference result from the neural network and return the inference result to the user terminal. For example, the user terminal may include various computing devices such as a smart phone, a tablet, a laptop and a personal computer, various wearable devices such as a smart watch and smart glasses, various home appliances such as a smart speaker, a smart TV and a smart refrigerator, a smart car, a smart kiosk, and an Internet of things (IoT) device.

The user terminal may simply provide the user with the inference result received from the server 1100, or perform a subsequent operation based on the inference result.

Referring to FIG. 12, an electronic device (e.g., the electronic device 100 of FIG. 1) may be implemented as a user terminal 1200. In FIG. 12, the user terminal 1200 is illustrated as a smart phone for ease of description. However, any device controlled by the user may be applicable thereto without limitation. The user terminal 1200 may obtain data to be inferred using a neural network directly from the user, and process a normalization layer included in the neural network by an accelerator 1220 according to the tensor processing method described above. In this example, an input tensor of the normalization layer may not be transmitted to a host processor 1210 outside the accelerator 1220. In addition, the user terminal 1200 may obtain an inference result from the neural network and simply provide the user with the result or perform a subsequent operation based on the inference result.

The electronic devices, host processors, off-chip memories, memory controllers, accelerators, on-chip memories, kernel generators, PEs, servers, user terminals, electronic device 100, host processor 110, off-chip memory 120, memory controller 130, accelerator 140, on-chip memory 610, kernel generator 620, PEs 630, server 1100, host processor 1110, accelerator 1120, user terminal 1200, host processor 1210, accelerator 1220, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented tensor processing method, comprising:

receiving a request to process a neural network including a normalization layer by an accelerator; and generating an instruction executable by the accelerator in response to the request, wherein, by executing the instruction, the accelerator is configured to determine an intermediate tensor corresponding to a result of a portion of operations of the normalization layer, by performing, in a channel axis direction, a convolution based on an input tensor and a kernel such that an element in the intermediate tensor is determined based on elements of a plurality of channels of the input tensor, wherein the input tensor is of the normalization layer, a number of input channels of the kernel is determined based on the input tensor, and at least a portion of scaling values of elements of the kernel are determined based on an inverse of a number of elements included in a same channel of the input tensor, wherein diagonal elements of the kernel have a first scaling value, and remaining elements of the kernel have a second scaling value different from the first scaling value, wherein the convolution is performed between the kernel and a transformed input tensor transformed such that elements included in a same channel of the input tensor are arranged in the channel axis direction, wherein the intermediate tensor is determined by transforming elements determined as a result of the convolution to a same form as the input tensor, and wherein the transforming of the determined elements comprises transforming the determined elements such that a number of channels of the intermediate tensor is equal to the number of channels of the input tensor.

2. The method of claim 1, wherein the intermediate tensor is determined by subtracting an average value of one or more elements of the input tensor from a value of each of the one or more elements through the convolution, and an output tensor corresponding to an output of the normalization layer is determined based on the intermediate tensor.

3. The method of claim 1, wherein the number of input channels and a number of output channels of the kernel are equal to the number of channels of the input tensor.

4. The method of claim 1, wherein the number of input channels and a number of output channels of the kernel are equal to the number of elements included in the same channel of the input tensor.

5. The method of claim 1, wherein the number of input channels of the kernel is equal to the number of channels of the input tensor, and the scaling values of the elements of the kernel correspond to the inverse of the number of channels of the input tensor.

6. The method of claim 1, wherein the intermediate tensor is determined based on an average value of elements included in the input tensor.

7. The method of claim 6, wherein elements of the intermediate tensor are respectively determined by averaging elements included in either one of:

a same column in each channel of the input tensor; and the same channel of the input tensor.

8. The method of claim 1, wherein the number of input channels of the kernel is equal to the number of elements included in the same channel of the input tensor, and scaling values of the elements of the kernel correspond to the inverse of the number of elements included in the same channel.

9. The method of claim 1, wherein the convolution is performed in the accelerator such that the input tensor is not transmitted externally from the accelerator for performing an operation according to the normalization layer.

10. The method of claim 1, wherein the accelerator is included in either one or both of a user terminal configured to receive data to be inferred using the neural network, and a server configured to receive the data to be inferred from the user terminal.

11. The method of claim 1, wherein the receiving of the request comprises receiving the request by a host processor, and the generating of the instruction comprises generating the instruction by the host processor.

12. A non-transitory computer-readable storage medium storing instructions that, when executed by one or more processors, configure the one or more processors to perform the method of claim 1.

13. An accelerator, comprising:

one or more processors configured to:

obtain an input tensor of a normalization layer included in a neural network, obtain a kernel having a number of input channels determined based on the input tensor and including at least a portion of elements of scaling values are determined based on an inverse of a number of elements included in a same channel of the input tensor, and determine an intermediate tensor corresponding to a result of a portion of operations of the normalization layer, by performing, in a channel axis direction, a convolution which is based on the input tensor and the kernel such that an element in the intermediate tensor is determined based on elements of a plurality of channels of the input tensor, wherein diagonal elements of the kernel have a first scaling value, and remaining elements of the kernel have a second scaling value different from the first scaling value, wherein the convolution is performed between the kernel and a transformed input tensor transformed such that elements included in a same channel of the input tensor are arranged in the channel axis direction, wherein the intermediate tensor is determined by transforming elements determined as a result of the convolution to a same form as the input tensor, and wherein the transforming of the determined elements comprises transforming the determined elements such that a number of channels of the intermediate tensor is equal to the number of channels of the input tensor.

14. The accelerator of claim 13, wherein the one or more processors are configured to determine the intermediate tensor by subtracting an average value of one or more elements of the input tensor from a value of each of the one or more elements through the convolution, and an output tensor corresponding to an output of the normalization layer is determined based on the intermediate tensor.

15. The accelerator of claim 13, wherein the number of input channels and a number of output channels of the kernel are equal to the number of channels of the input tensor.

16. The accelerator of claim 13, wherein the number of input channels and a number of output channels of the kernel are equal to the number of elements included in the same channel of the input tensor.

17. The accelerator of claim 13, wherein the number of input channels of the kernel is equal to the number of channels of the input tensor, and the scaling values of the elements of the kernel correspond to an inverse of the number of channels of the input tensor.

18. The accelerator of claim 13, wherein the number of input channels of the kernel is equal to the number of elements included in the same channel of the input tensor, and scaling values of the elements of the kernel correspond to an inverse of the number of elements included in the same channel.

19. The accelerator of claim 13, wherein the convolution is performed inside the accelerator such that the input tensor is not transmitted externally from the accelerator for performing an operation according to the normalization layer.

20. An electronic device comprising:

a host processor configured to generate an instruction; and the accelerator of claim 19, wherein the accelerator is configured to, by executing the instruction, determine the intermediate tensor.

21. An electronic device, comprising:

a host processor configured to generate an instruction executable by an accelerator in response to a request to process a neural network including a normalization layer by the accelerator; and the accelerator configured to, by executing the instruction, determine an intermediate tensor corresponding to a result of a portion of operations of the normalization layer, by performing, in a channel axis direction, a convolution which is based on an input tensor and a kernel such that an element in the intermediate tensor is determined based on elements of a plurality of channels of the input tensor, wherein the input tensor is of the normalization, a number of input channels of the kernel is determined based on the input tensor, and at least a portion of scaling values of elements of the kernel are determined based on an inverse of a number of elements included in a same channel of the input tensor, wherein diagonal elements of the kernel have a first scaling value, and remaining elements of the kernel have a second scaling value different from the first scaling value, wherein the convolution is performed between the kernel and a transformed input tensor transformed such that elements included in a same channel of the input tensor are arranged in the channel axis direction, wherein the intermediate tensor is determined by transforming elements determined as a result of the convolution to a same form as the input tensor, and wherein the transforming of the determined elements comprises transforming the determined elements such that a number of channels of the intermediate tensor is equal to the number of channels of the input tensor.

22. The electronic device of claim 21, wherein the accelerator is configured to determine the intermediate tensor by subtracting an average value of one or more elements of the input tensor from a value of each of the one or more elements through the convolution, and an output tensor corresponding to an output of the normalization layer is determined based on the intermediate tensor.

* * * * *